United States Patent
Park et al.

(10) Patent No.: US 9,302,390 B2
(45) Date of Patent: Apr. 5, 2016

(54) DEVICE AND METHOD FOR CONTROLLING WEAVING MOTION IN REAL TIME

(71) Applicant: SAMSUNG HEAVY IND. CO., LTD., Seoul (KR)

(72) Inventors: Youngjun Park, Daejeon (KR); Youngyoul Ha, Seoul (KR); Sangmin Kang, Daejeon (KR)

(73) Assignee: Samsung Heavy Ind. Co., Ltd., Seoul (KR)

(*) Notice: Subject to any disclaimer, the term of this patent is extended or adjusted under 35 U.S.C. 154(b) by 18 days.

(21) Appl. No.: 14/356,113

(22) PCT Filed: Oct. 5, 2012

(86) PCT No.: PCT/KR2012/008059
§ 371 (c)(1),
(2) Date: May 2, 2014

(87) PCT Pub. No.: WO2013/065955
PCT Pub. Date: May 10, 2013

(65) Prior Publication Data
US 2014/0316568 A1    Oct. 23, 2014

(30) Foreign Application Priority Data
Nov. 2, 2011 (KR) .................. 10-2011-0113482

(51) Int. Cl.
B25J 9/16    (2006.01)
(52) U.S. Cl.
CPC ..... *B25J 9/1664* (2013.01); *G05B 2219/49384* (2013.01)

(58) Field of Classification Search
CPC ...... B25J 9/1664; B25J 9/1687; B25J 9/1671; G05B 2219/29384; G05B 2219/49386
See application file for complete search history.

(56) References Cited

U.S. PATENT DOCUMENTS

| 4,785,155 A * | 11/1988 | Kishi et al. ............... 219/125.12 |
| 8,487,213 B2 | 7/2013 | Asai et al. |
| 8,742,292 B2 | 6/2014 | Fukunaga et al. |
| 2008/0083716 A1 | 4/2008 | Shigeyoshi |
| 2008/0203072 A1 | 8/2008 | Hedenfalk et al. |

(Continued)

FOREIGN PATENT DOCUMENTS

| CN | 1415460 A | 5/2003 |
| CN | 1655076 A | 8/2005 |
| CN | 1923470 A | 3/2007 |

(Continued)

*Primary Examiner* — James Trammell
*Assistant Examiner* — Adam Mott
(74) *Attorney, Agent, or Firm* — McDermott Will & Emery LLP

(57) ABSTRACT

A device and method for controlling a real time weaving motion are provided. In order to control operation of a robot in a working space, a main moving path of the robot in the working space is determined, a unit motion constituting the determined main moving path is generated, while a continuous motion in which a unit motion is connected, weaving that dynamically changes offset is generated, and a compensation displacement or a compensation rotation amount that is determined according to the work environment is generated. A position and a rotation amount of the robot are calculated in the working space according to at least one of the unit motion, the weaving, the compensation displacement, and the compensation rotation amount.

15 Claims, 9 Drawing Sheets

(56) References Cited

U.S. PATENT DOCUMENTS

2009/0107969 A1* 4/2009 Asai et al. .................. 219/124.1
2011/0278272 A1* 11/2011 Fukunaga et al. ....... 219/130.01

FOREIGN PATENT DOCUMENTS

| | | |
|---|---|---|
| CN | 1953848 A | 4/2007 |
| CN | 101402199 A | 4/2009 |
| CN | 101422837 A | 5/2009 |
| CN | 102240838 A | 11/2011 |
| EP | 1268110 B1 | 1/2003 |
| EP | 2055420 B1 | 5/2009 |
| JP | 03-018478 A | 1/1991 |
| JP | 05-057642 A | 3/1993 |
| JP | 06-222817 A | 8/1994 |
| JP | 07-020919 A | 1/1995 |
| JP | 08-108277 A | 4/1996 |
| JP | 10-244367 A | 9/1998 |
| JP | 11-296215 A | 10/1999 |
| JP | 2002-096170 A | 4/2002 |
| JP | 2004-252814 A | 9/2004 |
| JP | 2007-216232 A | 8/2007 |
| JP | 4498061 B2 | 7/2010 |
| KR | 10-0155913 B1 | 7/1998 |
| KR | 10-2001-0081275 A | 8/2001 |
| KR | 10-2012-0005082 A | 1/2012 |
| WO | WO-94/17461 A1 | 8/1994 |

* cited by examiner

DEVICE AND METHOD FOR CONTROLLING WEAVING MOTION IN REAL TIME

TECHNICAL FIELD

The present invention relates to a device and method in which a robot operating at a working space controls a real time weaving motion.

BACKGROUND ART

Nowadays, various kinds of industrial work are performed by a robot. When a position of a work target that is worked on by a robot is moved, a control system for controlling motion of the robot is required.

A control system for motion control of the robot controls the robot to move along a programmed motion path. Further, the control system controls operation of the robot according to a programmed work content.

When a real time situation is changed due to a work environment change of the robot and a motion path change, a control system that controls the robot according to a programmed content cannot appropriately control motion and operation of the robot.

DISCLOSURE

Technical Problem

The present invention has been made in an effort to provide a device and method having advantages of being capable of appropriately controlling a motion and operation of a robot, when a real time situation changes.

Technical Solution

An exemplary embodiment of the present invention provides a real time weaving motion control device for controlling operation of a robot in a working space, the real time weaving motion control device including: a preprocessor that determines a main moving path of the robot in the working space and that generates a unit motion forming the determined main moving path and that generates weaving that dynamically changes offset while performing a continuous motion in which unit motions are connected and that generates at least one of a compensation displacement and a compensation rotation amount that are determined according to a work environment; and a working space motion synthesizing unit that calculates a position and a rotation amount of the robot in the working space according to at least one of the unit motion, the weaving, the compensation displacement, and the compensation rotation amount.

The preprocessor may include: a continuous motion processor that determines a main moving path that is determined before starting a motion of the robot or a main moving path that is generated in real time according to continuous motion method selection information and that generates the unit motion; a weaving motion processor that selects weaving that is determined before starting a motion of the robot or weaving that is generated in real time according to weaving motion method selection information and that generates a relative weaving amount; and a compensation posture processor that generates the compensation displacement or the compensation rotation amount for reflecting a random displacement or rotation amount according to a situation change of the working space to a motion.

The continuous motion processor may include: a path list storage unit that stores a main moving path that is determined before starting the motion; a real time path generator that generates a new unit motion in real time, when a reason for a situation change of the working space or a motion path change occurs; a path cue that stores a unit motion that is generated in the real time path generator; a path selector that selects one of a unit motion of the path cue and a unit motion of the path list storage unit according to the continuous motion method selection information; and a working space continuous motion generator that connects a unit motion that is transferred from the path selector as a continuous motion according to continuous motion start/end information representing a starting point and an ending point of predetermined work.

The working space continuous motion generator may start an (n+1)th unit motion of a continuous motion according to a unit motion start method and process an n-th unit motion according to a previous motion processing method.

The unit motion start method may be one of: a method of starting the (n+1)th unit motion at a time point at which the n-th unit motion changes from acceleration or a constant speed to deceleration; a method of starting the (n+1)th unit motion at a time point at which the n-th unit motion changes from acceleration to a constant speed or deceleration; a method of starting the (n+1)th unit motion at a time point of a predetermined time before the n-th unit motion stops; and a method of starting the (n+1)th unit motion at a time point at which an overlapping motion between the n-th unit motion and an (n−1)th previous unit motion is terminated.

The previous motion processing method may be one of: a method of decelerating the n-th unit motion and starting the (n+1)th unit motion; and a method of maintaining the n-th unit motion and starting the (n+1)th unit motion.

The weaving motion processor may include: a weaving list storage unit that stores a weaving list that is determined before starting the motion; a real time weaving generator that generates weaving in real time when a reason for a situation change of the working space or a motion path change while working occurs; a weaving cue that stores weaving that is generated in the real time weaving generator in a unit weaving unit; a weaving selector that selects unit weaving that is included in the weaving list or unit weaving of the weaving cue according to the weaving motion method selection information; and a working space weaving motion generator that receives an input of weaving start/end information and weaving sampling time and weaving reference variable information for distinguishing unit weaving that is selected by the weaving selector and that determines a relative weaving amount within the weaving sampling time using the selected unit weaving and weaving reference variable information, wherein the weaving reference variable information may include a weaving reference variable for setting a weaving change point in which next unit weaving is performed while performing present unit weaving.

The working space weaving motion generator may determine the weaving reference variable based on a time, a trace length, or a trace rotation amount of the continuous motion.

The working space weaving motion generator may determine the weaving reference variable, determine a first variable using a weaving cycle in which the weaving function repeats and the determined weaving reference variable, and generate the weaving function as a function of the first variable.

The working space weaving motion generator may generate the weaving reference variable and the first variable, when the weaving reference variable does not arrive at the weaving change point.

The working space motion synthesizing unit, the working space continuous motion generator, the working space weaving motion generator, and the compensation posture generator may be synchronized with the weaving sampling time to operate.

The real time weaving motion control device may further include a joint space converter that receives an input of a position and a rotation amount of a robot from the working space motion synthesizing unit and that generates operation of a joint of the robot so as to realize the weaving motion, wherein the joint space converter may be synchronized with the weaving sampling cycle to operate.

Another embodiment of the present invention provides a method of controlling a real time weaving motion for controlling operation of a robot in a working space, the method including: generating a unit motion in real time according to whether a real time change reason including a reason for a situation change of the working space and a motion path change while working occurs and selecting one of a unit motion that is determined before starting a motion of the robot and a unit motion that is generated in real time; generating unit weaving in real time according to whether a real time change reason occurs and selecting one of unit weaving that is determined before starting a motion of the robot and unit weaving that is generated in real time; generating at least one of a compensation displacement and a compensation rotation amount that are determined according to a situation change of the working space; and calculating a position and a rotation amount of the robot in the working space according to at least one of the unit motion, the unit weaving, the compensation displacement, and the compensation rotation amount.

The method may further include determining a relative weaving amount according to the selected unit weaving, wherein the determining of a relative weaving amount may include determining a relative weaving amount within a weaving sampling time using the selected unit weaving and weaving reference variable information, and wherein the weaving reference variable information may include a weaving reference variable for setting a weaving change point in which next unit weaving is performed while performing present unit weaving.

The determining of a relative weaving amount may further include: determining the weaving reference variable based on a time, a trace length, or a trace rotation amount of the continuous motion; and determining a first variable using a weaving cycle that repeats the weaving function and the determined weaving reference variable and generating the weaving function as a function of the first variable.

Advantageous Effects

According to the present invention, a device and method that can appropriately control motion and operation of a robot when a real time situation changes are provided.

MODE FOR INVENTION

Figure 1:
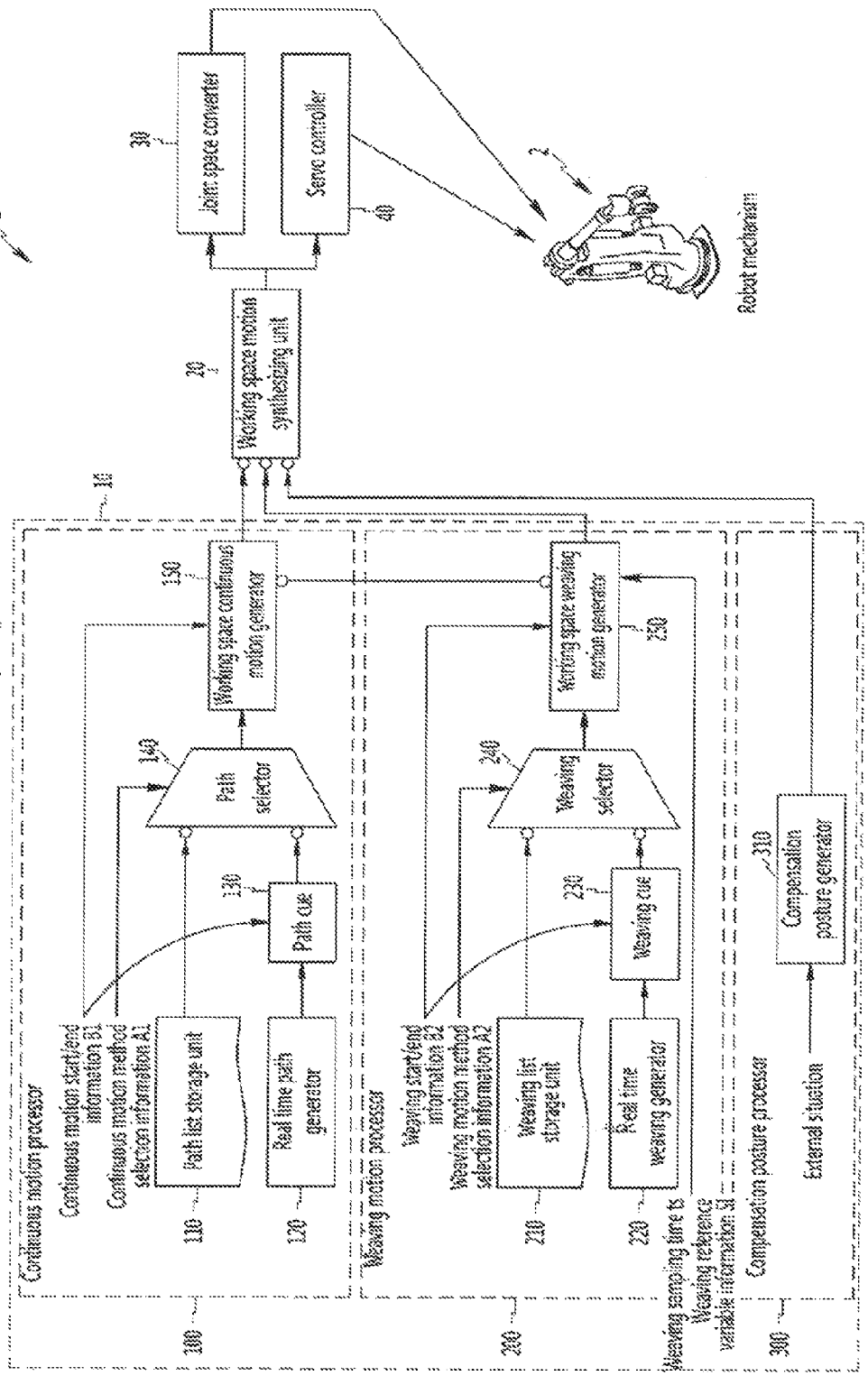
FIG. 1 is a diagram illustrating a motion control system for controlling a motion of a welding robot according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

In the following detailed description, only certain exemplary embodiments of the present invention have been shown and described, simply by way of illustration.

FIG. 1 is a diagram illustrating an example in which a device and method for controlling a weaving motion are applied to control a motion of a welding robot according to an exemplary embodiment of the present invention. An exemplary embodiment of the present invention illustrates a welding robot that performs welding among industrial robots. However, the present invention is not limited thereto, and the spirit of the invention that is described in an exemplary embodiment may be used for motion control of another robot.

As shown in FIG. 1, a motion control system 1 includes a preprocessor 10, a working space motion synthesizing unit 20, a joint space converter 30, and a servo controller 40. FIG. 1 also illustrates a robot mechanism 2, which is a control target of the motion control system 1.

The preprocessor 10 determines a main moving path on a working space of a robot, generates a unit motion according to the determined main moving path, generates weaving that dynamically changes offset while in continuous motion, and generates a compensation displacement or a compensation rotation amount that is determined according to a work environment. Hereinafter, a weaving motion includes a motion in which a unit motion and weaving are combined. A continuous motion indicates a combination of unit motions. A compensation displacement or a compensation rotation amount is reflected to a weaving motion.

The preprocessor 10 includes a continuous motion processor 100, a weaving motion processor 200, and a compensation posture processor 300.

The continuous motion processor 100 determines a main moving path on a working space of a robot, and generates a unit motion in the determined main moving path. In this case, the main moving path may be determined before starting a motion or is generated in real time while operating, and in order to select one of a main moving path that is determined before starting a motion and a main moving path that is generated in real time, continuous motion method selection information A1 is generated.

The continuous motion processor 100 includes a path list storage unit 110, a real time path generator 120, a path cue 130, a path selector 140, and a working space continuous motion generator 150.

The continuous motion method selection information A1 is generated according to an external situation change that may occur while performing a motion of the robot and a motion path change while working. That is, when an external situation change and a motion path change occur, continuous motion method selection information A1 that selects a main moving path that is generated in real time instead of a main moving path that is determined before starting a motion is generated. Otherwise, continuous motion method selection information A1 that selects a main moving path that is determined before starting a motion is generated.

An example of an external situation change that may occur in robot work is described as follows.

1) Deformation of a member by welding
2) Change of a paint target by a paint jet force
3) Change of a target by a suction force of a collecting blast Examples of reasons for a motion path change while working are described as follows.

1) When an outside target not previously existing in a prearranged plan enters a work area
2) When another robot processes previously scheduled work among multiple robot work The content is an example, and various requests may occur according to use of the robot. Whenever such various requests occur, it is necessary to generate a main moving path in real time.

The continuous motion processor 100 produces a motion in a main moving path that is determined in a working space. The main moving path is a set of unit motions. The unit motion is defined by a profile including an order, a target pose, a robot configuration, acceleration or an acceleration time, deceleration or a deceleration time, a maximum speed or a constant speed time, angular acceleration or an angular acceleration time, angular deceleration or an angular deceleration time, a maximum angular speed or a constant speed time, a unit motion start method, and a previous motion processing method.

The pose indicates information about a position and a rotation of a robot. An order of a unit motion is determined according to an order between unit motions constituting a path. Each of unit motions includes order information thereof. A target pose is information including a target position and a target direction.

The robot configuration indicates a posture of a robot. The robot is set in an appropriate posture according to work, and may have different postures at the same pose. For example, a welding robot takes a posture in a form similar to an arm of a human, and when the welding robot takes the same pose, the welding robot may take a posture of a left arm or a right arm. That is, even if the welding robot performs the same rotation at the same position in a working space, work content is changed according to whether the welding robot takes a left-handed posture or a right-handed posture.

The robot configurations are different according to the number and the kind of axes of the robot, and the robot configuration may be determined on a robot basis.

A moving path of the robot may be classified into an acceleration segment in which a moving speed increases, a constant speed segment that is maintained at a maximum speed, and a deceleration segment in which a moving speed decreases according to a moving speed. Further, a rotation path of the robot may be classified into an angular acceleration segment in which an angular speed increases, an angular constant speed segment that is maintained in a maximum angular speed, and an angular deceleration segment in which an angular speed decreases according to an angular speed.

Acceleration or an acceleration time is information corresponding to an acceleration segment, deceleration or a deceleration time is information corresponding to a deceleration segment, a maximum speed or a constant speed time is information corresponding to a constant speed segment, angular acceleration or an angular acceleration time is information corresponding to an angular acceleration segment, angular deceleration or an angular deceleration time is information corresponding to an angular deceleration segment, and a maximum angular speed or a constant speed time is information corresponding to an angular constant speed segment.

A moving path that is determined before starting a motion is stored at the path list storage unit 110. A moving path is a set of unit motions, and thus a set of unit motions representing a determined moving path are stored at the path list storage unit 110.

When a reason for an external situation change or a motion path change while working occurs, the real time path generator 120 generates a new moving path in real time. That is, the real time path generator 120 generates a unit motion in real time.

The real time path generator 120 may use various methods so as to generate a new moving path in real time. For example, according to a method of selecting (generating a unit motion) a pose through a video camera, a target pose of a path may be changed by the video camera based on a processed video result. In order to interlock weaving with a path that is generated in this way, a weaving motion processor controls a weaving motion.

Because a path generation time including times that are consumed for a video processing is indefinite, a motion of the robot may be stopped. In order to prevent this, a buffer means is necessary, and in an exemplary embodiment of the present invention, a "path cue" is used as a buffer means. Specifically, as unit motion generation of the real time path generator 120 is delayed, in order to prevent a motion from being stopped, a unit motion may be stored at the path cue 130.

The path cue 130 includes a storage space for storing a unit motion, and the storage space may be embodied with a memory that is divided in a unit motion unit. A size of the path cue 130 may be appropriately set according to a time that is consumed for generating a unit motion of the real time path generator 120.

Specifically, when continuous motion start/end information B1 notifies start of a unit motion, the path cue 130 transfers a corresponding unit motion to the path selector 140. When the continuous motion start/end information B1 notifies the end of a unit motion, the path cue 130 deletes a corresponding unit motion from the memory.

The path selector 140 selects one of a unit motion of the path list storage unit 110 and a unit motion that is transferred from the path cue 130 according to the continuous motion method selection information A1.

The working space continuous motion generator 150 receives an input of the continuous motion start/end information B1 and a unit path that is transferred from the path selector 140, and determines a target pose by generating a trajectory for a real time response of a motion control of a robot that performs work on a work path between a predetermined work starting point and an ending point. The target pose may be represented with a matrix of a position vector T_p(t) representing a target position and a rotation vector T_r(t) representing a target rotation amount.

The continuous motion start/end information B1 includes information about a predetermined work starting point and ending point. That is, the continuous motion start/end information B1 is information for distinguishing one unit motion of a plurality of unit motions. The motion control system 1 controls various unit motions. For example, the continuous motion start/end information B1 is information representing the start and the end of a unit motion that is controlled by a present motion control system 1 among several unit motions according to POSE to POSE (P2P: a method of moving a robot from a start pose to an end pose and moving the robot by determining an optimized form on each joint basis of the robot at an intermediate path) or a JOG method (a method of moving a robot with instructions of a speed on an axis basis or a posture speed). The working space continuous motion generator 150 distinguishes a continuous motion of a unit motion different from a presently generated continuous motion according to the continuous motion start/end information B1.

The working space continuous motion generator 150 starts each unit motion of a continuous motion according to a unit motion start method. A unit motion start method is a method of determining a start time point of a unit motion of a posterior order of a continuous unit motion.

Figure 2:
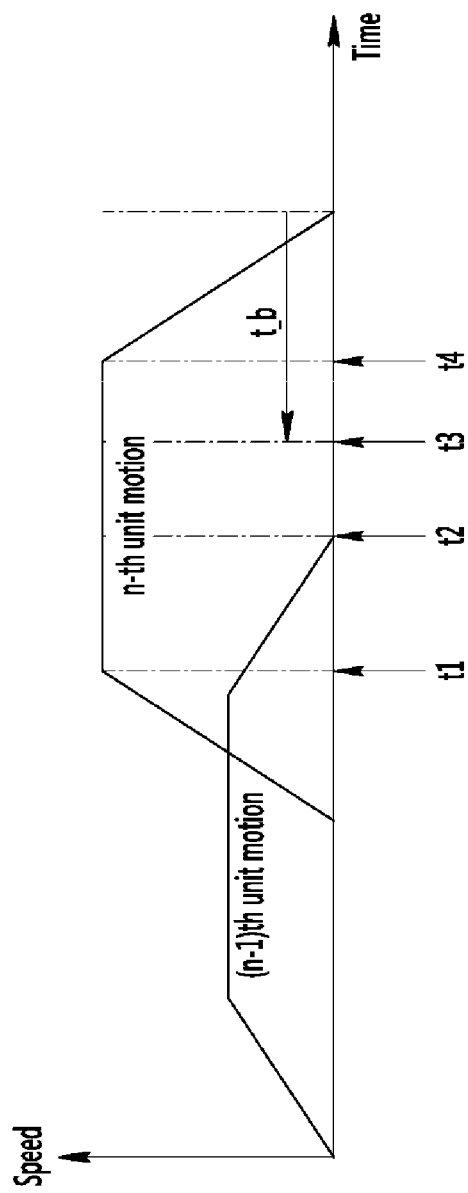
FIG. 2 is a diagram illustrating speed to time of each of an (n−1)th unit motion and an n-th unit motion.

Referring to FIG. 2, a method of starting a unit motion will be described.

FIG. 2 is a diagram illustrating a speed to a time of each of an (n−1)th unit motion and an n-th unit motion. Referring to FIG. 2, a method of starting an (n+1)th unit motion will be described.

A method of starting an (n+1)th unit motion may occur in one of the following 4 cases.

1) A time point t1 of converting from acceleration of a previous unit motion (an n-th unit motion) to a constant speed or deceleration 2) A time point t2 in which an overlapping motion between a previous unit motion (an n-th unit motion) and a unit motion ((n−1)th unit motion) before the previous unit motion is terminated 3) A time point t3 of a predetermined time t_b before a previous unit motion (an n-th unit motion) stops 4) A time point t4 of converting from acceleration or a constant speed of a previous unit motion (an n-th unit motion) to deceleration At any one time point of the time point t1 to the time point t4, a next unit motion ((n+1)th unit motion) may be started. Further, at a random time point between a period t2-t4, a period t4-t3, and a period t3-t1, an (n+1)th unit motion may be started.

The working space continuous motion generator 150 processes a previous unit motion of a continuous motion according to a previous motion processing method. The previous motion processing method is a method of processing a previous unit motion of a newly started unit motion.

Hereinafter, a previous motion processing method will be described with reference to FIGS. 3A-3C.

Figure 3A:
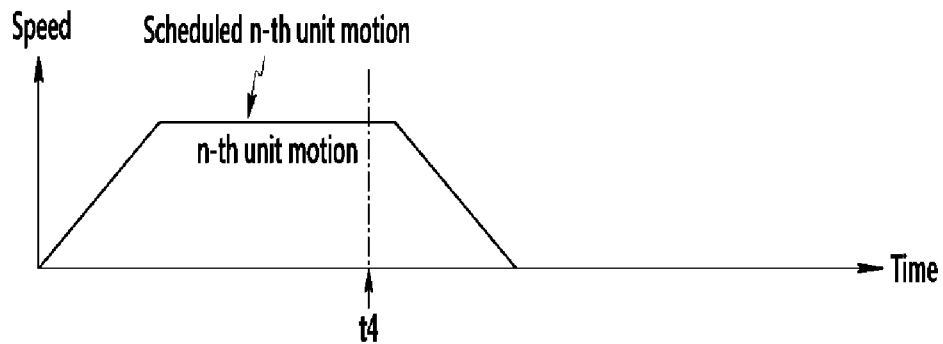
FIG. 3A is a diagram illustrating speed to time of a scheduled n-th motion.

FIG. 3A is a diagram illustrating speed to time of a scheduled n-th motion.

Figure 3B:
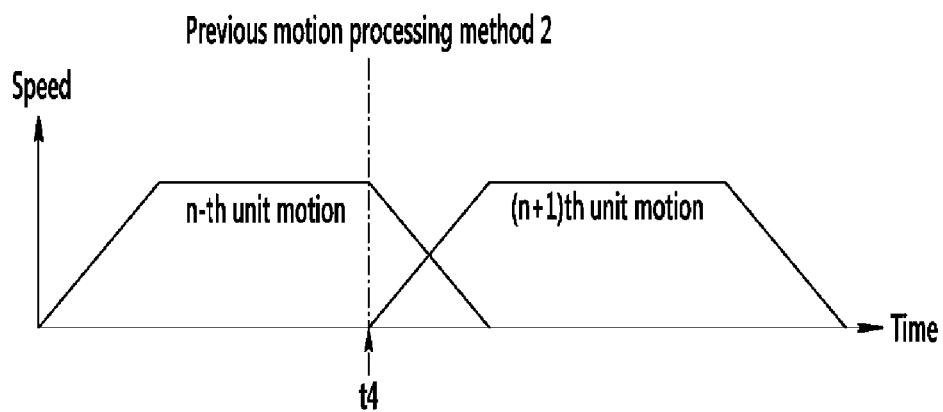
FIGS. 3B and 3C each are graphs illustrating speed to time of each of an n-th unit motion and an (n+1)th unit motion when following different previous motion processing methods.
Figure 3C:
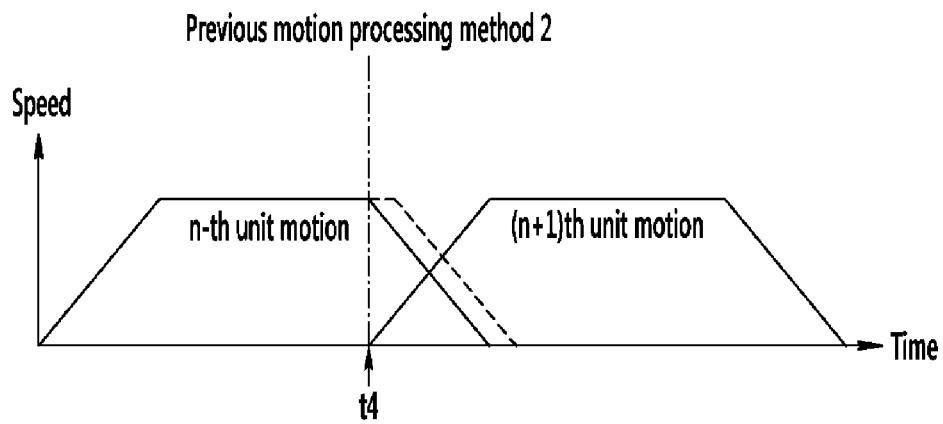

FIGS. 3B and 3C each are diagrams illustrating speed to time of each of an n-th unit motion and an (n+1)th unit motion according to a different previous motion processing method.

As shown in FIGS. 3B and 3C, a previous motion processing method is described as follows.

1) A method of decelerating a previous motion (n-th unit motion) and starting a next motion ((n+1)th unit motion)

2) A method of maintaining a previous motion (n-th unit motion) and starting a next motion ((n+1)th unit motion)

It is assumed that in a previous motion processing method that is shown in FIGS. 3B and 3C, a next unit motion follows "1) a time point t4 of converting from acceleration or a constant speed of a previous unit motion (an n-th unit motion) to deceleration". The present invention is not limited thereto, and in an exemplary embodiment, the above methods are described as settings that describe a previous motion processing method.

According to a previous motion processing method 1), a scheduled n-th unit motion is not yet terminated at a time point t4 at which a next unit motion ((n+1)th unit motion) starts, as indicated by a dotted line, but is decelerated from the time point t4 and is terminated.

Alternatively, a scheduled n-th unit motion is maintained, and at a time point t4, a next (n+1)th unit motion is started and thus two motions are overlapped according to a previous motion processing method 2.

Among the foregoing next unit motion processing methods, even at a time point other than the time point t4, a previous motion processing method is applied with the same principle.

When an initial speed of the robot is "0" at a start time point of a unit motion, the working space continuous motion generator 150 divides a segment into three segments of acceleration, constant speed, and deceleration according to a moving speed of the robot.

The working space continuous motion generator 150 generates a speed profile of each of preset three segments. Specifically, the working space continuous motion generator 150 generates a speed profile of an acceleration segment and a deceleration segment into a predetermined polynomial order and generates a speed profile in a constant speed segment into a speed profile having a constant value.

When an initial speed of the robot is not "0" at a start time point of a unit motion, the working space continuous motion generator 150 divides and sets a segment into three segments of blending, constant speed, and deceleration. Because an initial speed of a blending segment is not 0, the blending segment is a segment in which a previous unit motion and a present unit motion are combined.

The working space continuous motion generator 150 adds position information included in poses of each of a previous unit motion and a present unit motion, multiplies rotation information matrixes that are included in each pose, and combines the previous unit motion and the present unit motion. Therefore, a final position that should move for a blending period is determined.

The working space continuous motion generator 150 blends a speed profile that makes a speed to "0" in an initial speed at a blending segment and an acceleration segment speed profile for moving to a final position. By adding a difference between a distance that should be moved at a blending segment and a moved distance for a period that makes a speed to 0 at an initial speed to a speed profile for moving for a given blending segment, a blending segment speed profile is generated.

At a deceleration segment in which an initial speed is not 0, the working space continuous motion generator 150 may generate a speed profile with a predetermined polynomial order. In this case, when the above-described initial speed is 0, a polynomial order is higher than a speed profile order at a deceleration segment. At a constant speed segment in which an initial speed is not 0, the working space continuous motion generator 150 generates a speed profile of a constant speed.

The working space continuous motion generator 150 generates a target pose including a matrix of a position vector T_p(t) representing a target position by generating a trajectory according to a speed profile that is generated in this way and a rotation vector T_r(t) representing a target rotation amount. The working space continuous motion generator 150 transfers a generated target pose to the working space motion synthesizing unit 20.

The weaving motion processor 200 generates a motion, i.e., weaving, that dynamically changes offset among continuous motions. The weaving motion processor 200 uses a previously scheduled weaving list or a real time weaving generator with a method of dynamically changing offset.

The weaving motion processor 200 generates a weaving motion according to a weaving list that is determined on a working space. As described in a description of the real time path generator, when a reason for an external situation change or a motion path change occurs, the weaving motion processor 200 cannot use a previously scheduled weaving list. In this case, the weaving motion processor 200 generates a relative weaving amount according to a weaving list that is generated in the real time weaving generator.

That is, in order to generate a relative weaving amount according to a situation, the weaving motion processor 200 may generate a real time weaving list or selectively use a stored weaving list.

The weaving motion processor 200 includes a weaving list storage unit 210, a real time weaving generator 220, a weaving cue 230, a weaving selector 240, and a working space weaving motion generator 250.

The weaving list storage unit 210 stores a list of weaving that is determined before starting a motion.

Weaving motion method selection information A2 is generated according to whether a reason for an external situation change that may occur while a motion of the robot and a motion path change while working occurs. That is, when one of reasons for an external situation change and a motion path change occurs, weaving motion method selection information A2 that selects weaving that is generated in real time occurs instead of main weaving that is determined before starting a motion. Otherwise, continuous motion method selection information A2 that selects weaving that is determined before starting a motion occurs.

The real time weaving generator 220 generates new weaving in real time when a reason for an external situation change or a motion path change while working occurs. That is, the real time weaving generator 220 generates unit weaving in real time. In order to generate new weaving in real time, the real time weaving generator 220 may use various methods.

The weaving cue 230 includes a storage space for storing unit weaving, and the storage space may be embodied with a memory that is divided in a unit weaving unit. A size of the weaving cue 230 may be appropriately set according to a time that is consumed for generating unit weaving of the real time weaving generator 220. The weaving cue 230 transfers and deletes stored unit weaving according to weaving start/end information B2.

Specifically, when the weaving start/end information B2 notifies the start of unit weaving, the weaving cue 230 transfers the corresponding unit weaving to the weaving selector 240. When the weaving start/end information B2 notifies the end of unit weaving, the weaving cue 230 deletes corresponding unit weaving from a memory.

The weaving selector 240 selects one of unit weaving that is transferred from the weaving list storage unit 210 and unit weaving that is transferred from the weaving cue 230 according to weaving motion method selection information A2.

The working space weaving motion generator 250 receives an input of weaving motion start/end information B2 and unit weaving that is transferred from the weaving selector 240, and determines a relative weaving amount of continuous motion according to unit weaving. The relative weaving amount may be represented with a matrix of a position vector W_p(t) and a rotation vector W_r(t).

The weaving start/end information B2 is transferred to the working space weaving motion generator 250 and the weaving cue 230. When the weaving start/end information B2 notifies the weaving end, the weaving cue 230 is emptied. The weaving start/end information B2 is information for distinguishing one of a plurality of weaving motions together with the continuous motion start/end information B1. The working space weaving motion generator 250 distinguishes weaving of a continuous motion different from weaving of a continuous motion that is presently generated according to the weaving motion start/end information B2.

As described above, each of the path cue 130 and the weaving cue 230 empty a cue according to the continuous motion start/end information B1 and the weaving start/end information B2. That is, in order to prevent a weaving motion to be started next and a presently generated weaving motion from being mixed, data of the present weaving motion is deleted. This prevents an erroneous operation that may occur when generating a weaving motion.

The foregoing weaving list is a set of unit weaving. Unit weaving is defined by direction selection, a reference vector, a weaving change point, a maximum weaving pose, a weaving cycle, and a weaving function.

Direction selection of unit weaving is determined by a moving direction vector and a reference vector. A vector representing a direction of unit weaving is referred to as a weaving direction vector Wd. Wd is formed with Wd_x, Wd_y, and Wd_z according to an xyz coordinate axis.

The weaving motion processor 200 sets a weaving direction vector Wd for determining a relative weaving amount. Various methods of setting a weaving direction vector W may exist.

For example, the weaving motion processor 200 may follow one of 1) a method of determining a weaving direction vector W in a direction orthogonal to a moving direction vector D and a reference vector N, and 2) a method of determining a weaving direction vector W with a random vector based on a working space.

In the method 1), the moving direction vector D is a vector representing a path that is selected from the continuous motion processor 100, and a reference vector N is a vector that is perpendicular to the moving direction vector D on the same plane. In this case, the moving direction vector D is represented with (D_x, D_y, D_z), and the reference vector N is represented with (N_x, N_y, N_z).

In the method 2), the moving direction vector D may be determined with (1, 0, 0), the reference vector N may be determined with (0, 1, 0), and the weaving direction vector W may be determined with (0, 0, 1).

The weaving change point represents a point at which next unit weaving of presently performing unit weaving is performed. When unit weaving occurs in real time, if a size of a weaving cue is 0, weaving may be changed at a random desired point and thus a weaving change point within unit weaving is ignored.

However, when unit weaving occurs in real time, if a size of a weaving cue is not 0, because weaving cannot be changed at a desired point, a point at which next unit weaving of presently performing unit weaving is performed according to a size of a weaving cue should be set. That is, when a weaving cue exists (when a cue size is not 0), the weaving cue should have time information about a time point (weaving change point) at which next unit weaving should be reflected. If this information does not exist, weaving information that is stored at a weaving cue is simultaneously performed.

The weaving change point should be set to synchronize with a unit motion of a continuous motion. Alternatively, a predetermined point "s_d" of a weaving reference variable "S" for setting a weaving change point may be set as a weaving change point.

When a predetermined point s_d of s is set to a weaving change point, a starting point in which next unit weaving starts is a point first satisfying s>s_d.

A weaving reference variable may be set based on a time, a trace length, or a trace rotation amount. When the weaving reference variable is a variable based on a time, the weaving reference variable becomes s(t).

When the weaving reference variable is a variable based on a trace length, if a motion is a set of straight line unit motions, a moving length d is set to a weaving reference variable. Therefore, the weaving reference variable becomes s(d).

When a continuous motion is a constant speed, a result on work space according to a weaving reference variable based on a time and a result on work space according to a weaving reference variable based on a trace length are the same. When a continuous motion is not a constant speed, a result on work space according to a weaving reference variable based on a trace length and a result on work space according to a weaving reference variable based on a time are different.

Figure 4:
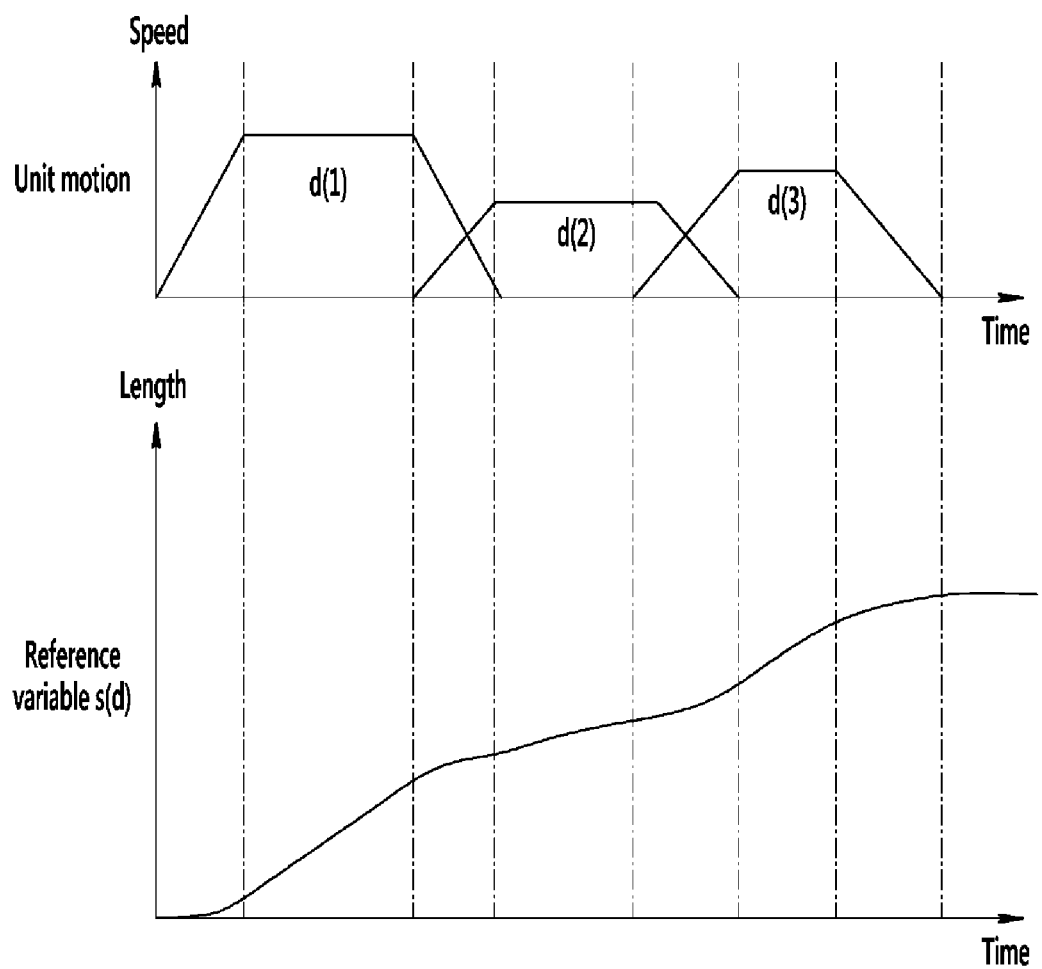
FIG. 4 is a graph illustrating a relationship between a unit motion and a reference variable when the reference variable follows a trace length reference.

FIG. 4 is a graph illustrating a relationship between a unit motion and a weaving reference variable when a weaving reference variable is a variable based on a trace length.

As continued unit motions d(1), d(2), and d(3) that are shown in FIG. 4 are added, a weaving reference variable "s(d)" is generated.

When a weaving reference variable is a variable based on a trace rotation amount, if a motion is a set of rotation unit motions, a moved rotation amount r is set to a weaving reference variable. This is the same as a weaving reference variable generation method based on a trace length that is shown in FIG. 4. That is, rotation unit motions are added and thus a weaving reference variable "s(r)" is generated.

A maximum weaving pose P_max determines a relative pose according to a weaving direction vector. A relative pose is a weaving direction vector, and represents whether weaving is performed with which size and which direction. That is, a direction and a size of weaving are determined according to a maximum weaving pose P_max and a weaving direction vector W. The maximum weaving pose P_max is defined by P_x, P_y, P_z, P_roll, P_pitch, and P_yaw. For example, the maximum weaving pose P_max is calculated in a form of a product of a homogeneous transform matrix. The homogeneous transform matrix includes entire information about a position and a rotation. In this case, P_x, P_y, and P_z represent a position in xyz coordinates, and P_roll, P_pitch, and P_yaw are information representing a rotation level of an xyz coordinates.

The weaving function f(k) is a function for determining whether to generate a maximum weaving pose P_max with which motion. That is, the maximum weaving pose P_max is a function for determining an occurring motion shape. The weaving function f(k) may be selected as a periodic function in which a cycle and a maximum value are 1 [max f(k)=1].

Because a size of weaving is reflected to the maximum weaving pose P_max, a maximum size of the weaving function f(k) is set to 1, and the weaving function f(k) is set so that a cycle of the weaving function f(k) becomes 1.

For example, the weaving function f(k) may be set to a trigonometric function such as sin(k/2pi) or cos(k/pi), or may be set to a square pulse or a triangular pulse in which a maximum size is 1 and a cycle is 1. In this case, when the weaving function f(k) is a trigonometric function, the weaving function f(k) is a continuous weaving function, and when the weaving function f(k) is a square pulse or a triangular pulse, the weaving function is a non-continuous weaving function.

In the continuous weaving function f(k), a differential value d(f(k))/dt to a time is not 0, and a starting point and an ending point thereof are the same [f(0)=f(1)].

A weaving cycle sp represents a time in which a weaving function is repeated, and a relationship of Equation 1 is formed between the weaving reference variable s(t) and the variable k.

$$\mod(s(t), sp) = k(t) \tag{Equation 1}$$

Here, a mod calculation represents a remainder that divides a sequential weaving reference variable s(t) by a weaving cycle sp. That is, a remainder that divides a sequential weaving reference variable s(t) by a weaving cycle sp is a variable k.

The weaving motion processor 200 operates a weaving sampling time ts as a cycle. Therefore, the weaving motion processor 200 should calculate a weaving amount within the weaving sampling time ts. The weaving reference variable information SI notifying a method of setting the weaving sampling time ts and the weaving reference variable s is transferred to the working space weaving motion generator 250.

The working space weaving motion generator 250 determines a weaving reference variable s according to the weaving reference variable information SI, and when the weaving reference variable s is determined, the working space weaving motion generator 250 determines a variable k, while the working space weaving motion generator 250 generates a relative weaving amount according to the unit weaving and the weaving reference variable s. In this case, the working space weaving motion generator 250 operates in a constant order every weaving sampling time ts, thereby determining a relative weaving amount. When the weaving reference variable s is a variable based on time, a relative weaving amount is a vector W_p(t) and a matrix W_r(t).

The weaving reference variable information SI includes information about whether the weaving reference variable s is a variable based on time, a variable based on a trace length, or a variable based on a trace rotation amount. Therefore, the weaving motion generator 250 determines a weaving reference variable s and a variable k according to the weaving reference variable information SI. When the weaving reference variable information SI is a variable based on time, a reference k(t) is determined according to Equation 1. At the weaving motion generator 250, a method of setting a variable k according to a weaving reference variable s is previously set.

When the weaving reference variable information SI instructs the weaving reference variable s as a variable based on a trace length or a trace rotation amount, the working space weaving motion generator 250 generates a trace length or a trace rotation amount every weaving sampling time ts. The working space weaving motion generator 250 receives a unit motion from the working space continuous motion generator 150 and adds unit motions, thereby generating a trace length or a trace rotation amount.

For example, the working space weaving motion generator 250 receives and adds unit weaving (d(1), d(2), . . . ) from the working space continuous motion generator 150 using a method of adding a trace length that is described with reference to FIG. 4, thereby generating a weaving reference variable s(d).

Further, the working space weaving motion generator 250 adds a rotation amount (r(1), r(2), . . . ) of unit weaving from the working space continuous motion generator 150, thereby generating a weaving reference variable s(r).

Figure 5:
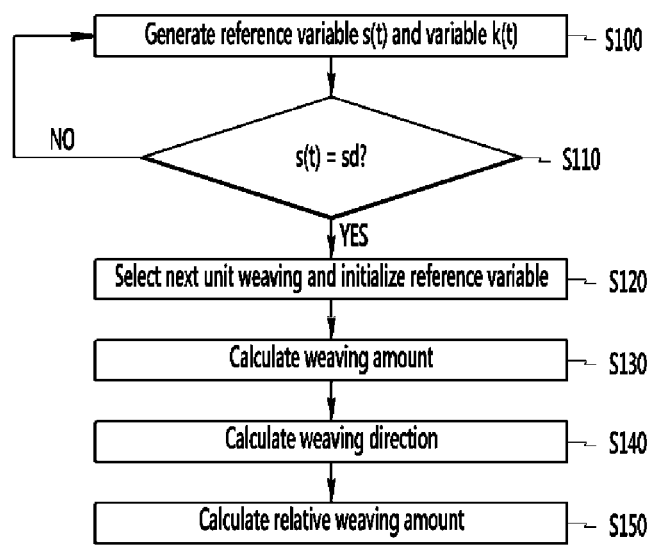
FIG. 5 is a flowchart illustrating operation of a working space weaving motion generator.

FIG. 5 is a flowchart illustrating operation of a working space weaving motion generator when a weaving reference variable is a variable based on time. Operation that is described hereinafter may be equally applied even when a weaving reference variable is a variable based on a trace length and a trace rotation amount. A variable is only changed from time to a trace length and a trace rotation amount.

As shown in FIG. 5, the working space weaving motion generator 250 generates a weaving reference variable s(t) and a variable k(t) (S100). It is described that the weaving reference variable s(t) is a variable based on time. However, the present invention is not limited thereto.

The working space weaving motion generator 250 determines whether the weaving reference variable s(t) is the same as a weaving change point sd (S110).

If the weaving reference variable s(t) is the same as a weaving change point sd, the working space weaving motion generator 250 selects next unit weaving and initializes the weaving reference variable s(t) (S120) [s(t)=0].

If the weaving reference variable s(t) is not the same as a weaving change point sd, the working space weaving motion generator 250 repeats step S100 of generating the weaving reference variable s(t) and the variable k(t).

The working space weaving motion generator 250 calculates a weaving amount of present unit weaving (S130). The weaving amount P_r(t) is represented with the product of a maximum weaving pose P_max and a weaving function f(k), as represented by Equation 2. The product of two factors represents a position and a rotation of the robot, and the position of the robot may be represented with coordinates in a xyz coordinate system, and the rotation of the robot may be represented with a rotation of an xyz coordinate system.

The product of the maximum weaving pose P_max and the weaving function f(k) is used to substitute a component of the weaving function f(k) corresponding to a component of the maximum weaving pose P_max.

$$P\_r(t)=P\_\max * f(k(t))=(P\_r\_x(t),P\_r\_y(t),P\_r\_z(t), P\_r\_\text{roll}(t),P\_r\_\text{pitch}(t),P\_r\_\text{yaw}(t)) \quad \text{(Equation 2)}$$

In this case, a weaving amount representing a position is referred to as a position weaving amount P_r_p(t), and a weaving amount representing a rotation is referred to as a rotation weaving amount P_r_r(t).

In weaving amounts that are generated in Equation 2, a position weaving amount P_r_p(t) is P_r_x(t), P_r_y(t), and P_r_z(t), and a rotation weaving amount P_r_r(t) is P_r_roll(t), P_r_pitch(t), and P_r_yaw(t).

The working space weaving motion generator 250 calculates a weaving direction (S140). The weaving direction is represented with a weaving vector Rw(t). As described above, the working space weaving motion generator 250 calculates an outer product of a moving direction vector D and a reference vector N and calculates a weaving direction vector Rw(t).

The working space weaving motion generator 250 calculates a relative weaving amount with the product of a weaving direction and a weaving amount (S150). The relative weaving amount is represented with relative weaving amount vectors W_p(t) and W_r(t). A position relative weaving amount vector W_p(t) of relative weaving amount vectors is a product of the position weaving amount and a weaving direction vector Rw(t) P_r_p(t), as represented with Equation 3. A rotation relative weaving amount vector W_r(t) of relative weaving amount vectors is a product of a rotation weaving amount P_r_r(t) and the weaving direction vector Rw(t), as represented with Equation 4.

$$W\_p(t)=Rw(t) * P\_r\_p(t) \quad \text{(Equation 3)}$$

$$W\_r(t)=Rw(t) * P\_r\_r(t) \quad \text{(Equation 4)}$$

In this way, the working space weaving motion generator 250 calculates a relative weaving amount. The working space weaving motion generator 250 distinguishes weaving of a weaving motion different from weaving of a presently generating weaving motion according to the weaving start/end information B2.

The compensation posture processor 300 reflects a random displacement or rotation amount according to an external situation change to a motion. A displacement or a rotation amount according to an external situation change may be calculated with various methods. In an exemplary embodiment of the present invention, the compensation posture processor 300 calculates a random displacement or rotation amount according to an external situation change according to a predetermined method.

The compensation posture processor 300 includes a compensation posture generator 310 that receives an input of an external situation. The compensation posture generator 310 detects an external situation, and when the external situation is changed, the compensation posture generator 310 calculates a displacement or a rotation amount for compensating the change of the external situation according to a predetermined method.

The compensation posture processor 300 generates a compensation displacement M_p(t) and a compensation rotation amount M_r(t) that are determined according to a random compensation posture value according to an external situation.

The working space motion synthesizing unit 20 receives an output of each of the working space continuous motion generator 150, the working space weaving motion generator 250, and the compensation posture generator 310, and calculates a position and a rotation amount of the robot on working space.

The working space motion synthesizing unit 20, the working space continuous motion generator 150, the working space weaving motion generator 250, the compensation posture generator 310, and the joint space converter 30 are synchronized with the same working space sampling cycle. The working space sampling cycle is synchronized with a weaving sampling cycle ts.

The working space motion synthesizing unit 20 calculates a position TS_p(t) on working space and a rotation amount TS_r(t) on working space based on an input, as represented with Equations 5 and 6.

$$TS\_p(t)=T\_p(t)+W\_p(t)+M\_p(t) \quad \text{(Equation 5)}$$

$$TS\_r(t)=T\_r(t)*W\_r(t)*M\_r(t) \quad \text{(Equation 6)}$$

As represented with Equations 5 and 6, the working space motion synthesizer 20 can generate weaving and reflect a compensation posture value in real time in every working space sampling cycle.

The joint space converter 30 receives an input of a position and a rotation amount on working space from the working space motion synthesizing unit 20, and generates an operation that should be performed at a joint of the robot so as to realize a weaving motion that is generated at the working space. That is, the joint space converter 30 converts a weaving motion of working space to a motion of joint space. As a specific method, inverse kinematics may be applied to the joint space converter 30.

The servo controller 40 is a constituent element that performs the control of a joint unit of a robot such as impedance control, position control, speed control, and torque control.

FIGS. 6A-6D each illustrate a weaving motion in which a motion control system is applied and generated according to an exemplary embodiment of the present invention.

Figure 6A:
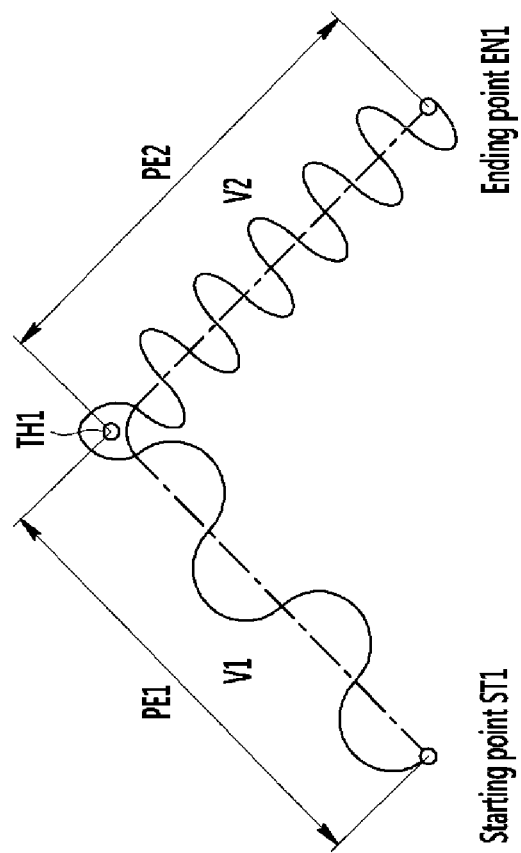
FIG. 6A is a diagram illustrating a case in which a weaving function is a sine function and in which a weaving reference variable is a variable based on time.

FIG. 6A is a diagram illustrating a case in which a weaving function is a sine function and in which a weaving reference variable is a variable based on time.

In FIG. 6A, a continuous motion path advancing from a starting point ST1 to an ending point EN1 is indicated by a one-dot-chain line. Further, a weaving motion at the working space in which weaving is added to a continuous motion is indicated by a solid line. A weaving function f(k) of FIG. 6A is sin(k/2pi).

In FIG. 6A, a speed V1 at a segment PE1 between the starting point ST1 and a via point TH1 is faster than a speed V2 at a segment PE2 between the via point TH1 and the ending point EN1.

Because the weaving function f(k) follows a weaving reference variable s(t) based on time, a weaving cycle that is included in the segment PE2 is larger than that of the segment PE1, as shown in FIG. 6A. Because the speed V1 is faster than the speed V2, a time that is consumed for moving the same distance is shorter. Because the weaving reference variable s(t) is a variable based on time, as the time is shorter, a weaving cycle that is included within a corresponding time reduces.

Figure 6B:
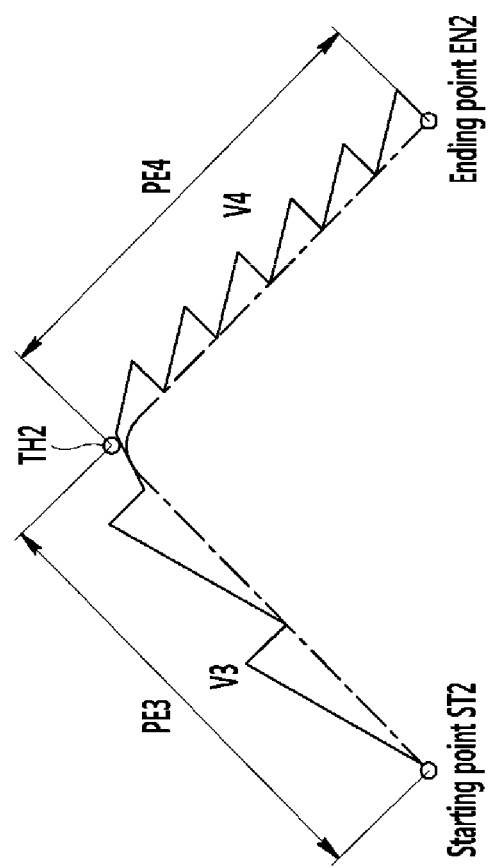
FIG. 6B is a diagram illustrating a case in which a weaving function is a linear function and in which a weaving reference variable is a variable based on time.

FIG. 6B is a diagram illustrating a case in which the weaving function is a linear function and in which a weaving reference variable is a variable based on time. Similar to a case of FIG. 6A, in FIG. 6B, a continuous motion path is indicated by a one-point chain line, and at the working space, a weaving motion is indicated by a solid line. A weaving function f(k) of FIG. 6A is k.

In FIG. 6B, a speed V3 at a segment PE2 between a starting point ST2 and a via point TH2 is faster than a speed V4 at the segment PE2 between the via point TH2 and an ending point EN2. Therefore, a weaving cycle that is included in a segment PE4 is larger than that of a segment PE3.

Figure 6C:
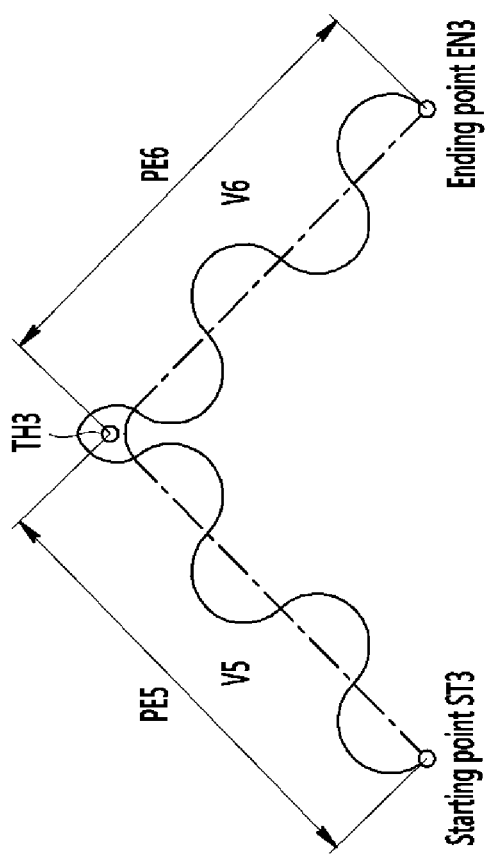
FIG. 6C is a diagram illustrating a case in which a weaving function is a sine function and in which a weaving reference variable is a variable based on a trace length.

FIG. 6C is a diagram illustrating a case in which a weaving function is a sine function and in which a weaving reference variable is a variable based on a trace length. Similar to a case of FIG. 6A, in FIG. 6C, a continuous motion path is indicated by a one-point chain line, and at the working space, a weaving motion is indicated by a solid line. A weaving function f(k) of FIG. 6C is sin(k/2pi).

As shown in FIG. 6C, when the weaving reference variable(s) is a variable based on a trace length, the number of weaving cycles that are included in a segment PE5 and a segment PE6 is determined according to a continuous motion moving path length regardless of a speed V5 and a speed V6.

Therefore, when lengths of the segment PE5 and the segment PE6 are the same, the number of weaving cycles that are included in each segment is the same. However, a time in which the work robot passes through the work segment PE5 and a time in which the work robot passes through the work segment PE6 are different according to a speed.

Figure 6D:
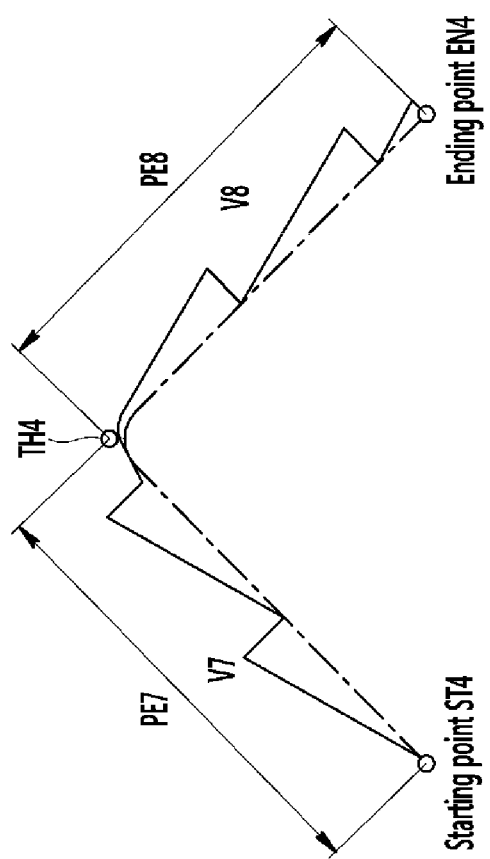
FIG. 6D is a diagram illustrating a case in which a weaving function is a linear function and in which a weaving reference variable is a variable based on a trace length.

FIG. 6D is a diagram illustrating a case in which a weaving function is a linear function and in which a weaving reference variable is a variable based on a trace length. Similar to a case of FIG. 6A, in FIG. 6D, a continuous motion path is indicated by a one-point chain line, and at the working space, a weaving motion is indicated by a solid line. A weaving function f(k) of FIG. 6D is k.

As shown in FIG. 6D, when the weaving reference variable(s) is a variable based on a trace length, the number of weaving cycles that are included in each of a work segment PE7 and a work segment PE8 is determined according to a length of a continuous motion moving path regardless of a speed V7 and a speed V8.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

In this way, according to an exemplary embodiment of the present invention that can control a weaving motion in real time, a real time weaving motion control device can cope with a change of an external work environment in real time.

The invention claimed is:

1. A real time weaving motion control device for controlling operation of a robot in a working space, the real time weaving motion control device comprising:
   a preprocessor that is configured to determine a main moving path of the robot in the working space, to generate a unit motion forming the determined main moving path, to generate a weaving motion that dynamically changes offset while performing a continuous motion in which unit motions are connected, and to generate at least one of a compensation displacement and a compensation rotation amount that are determined according to a work environment; and
   a working space motion synthesizing unit that is configured to calculate and control a position and a rotation amount of the robot in the working space according to at least one of the unit motion, the weaving motion, the compensation displacement, and the compensation rotation amount,
   wherein the preprocessor is configured to, according to a weaving motion method selection information, select between a weaving motion that is determined before starting a motion of the robot and a weaving motion that is generated in real time.

2. The real time weaving motion control device of claim 1, wherein the preprocessor comprises:

a continuous motion processor that is configured to determine the main moving path that is determined before starting a motion of the robot or the main moving path that is generated in real time according to continuous motion method selection information and to generate the unit motion;

a weaving motion processor that is configured to select the weaving motion that is determined before starting the motion of the robot or the weaving motion that is generated in real time according to the weaving motion method selection information and to generate a relative weaving amount; and a compensation posture processor that is configured to generate the compensation displacement or the compensation rotation amount for reflecting a random displacement or rotation amount according to a situation change of the working space to a motion.

3. The real time weaving motion control device of claim 2, wherein the continuous motion processor comprises:

a path list storage unit that is configured to store the main moving path that is determined before starting the motion;

a real time path generator that is configured to generate a new unit motion in real time when a reason for the situation change of the working space or a motion path change occurs;

a path cue that is configured to store a unit motion that is generated in the real time path generator;

a path selector that is configured to select one of the unit motion of the path cue and the unit motion of the path list storage unit according to the continuous motion method selection information; and a working space continuous motion generator that is configured to connect the unit motion that is transferred from the path selector according to a continuous motion start/end information representing a starting point and an ending point of predetermined work.

4. The real time weaving motion control device of claim 3, wherein the working space continuous motion generator is configured to start an (n+1)th unit motion of the continuous motion according to a unit motion start method, and is configured to process an n-th unit motion according to a previous motion processing method.

5. The real time weaving motion control device of claim 4, wherein the unit motion start method is one of:

a method of starting the (n+1)th unit motion at a time point at which the n-th unit motion changes from acceleration or a constant speed to deceleration;

a method of starting the (n+1)th unit motion at a time point at which the n-th unit motion changes from acceleration to a constant speed or deceleration;

a method of starting the (n+1)th unit motion at a time point of a predetermined time before the n-th unit motion stops; and a method of starting the (n+1)th unit motion at a time point at which an overlapping motion between the n-th unit motion and an (n−1)th previous unit motion is terminated.

6. The real time weaving motion control device of claim 4, wherein the previous motion processing method is one of:

a method of decelerating the n-th unit motion and starting the (n+1)th unit motion; and a method of maintaining the n-th unit motion and starting the (n+1)th unit motion.

7. The real time weaving motion control device of claim 2, wherein the weaving motion processor comprises:

a weaving list storage unit that is configured to store a weaving list that is determined before starting the motion;

a real time weaving generator that is configured to generate weaving in real time when a reason for a situation change of the working space or a motion path change while working occurs;

a weaving cue that is configured to store weaving that is generated in the real time weaving generator in a unit weaving unit;

a weaving selector that is configured to select a unit weaving that is included in the weaving list or a unit weaving of the weaving cue according to the weaving motion method selection information; and a working space weaving motion generator that is configured to receive an input of weaving start/end information and a weaving sampling time and a weaving reference variable for distinguishing unit weaving that is selected by the weaving selector and that is configured to determine a relative weaving amount within the weaving sampling time using the selected unit weaving and weaving reference variable information, wherein the weaving reference variable information comprises a weaving reference variable for setting a weaving change point in which a current unit weaving is stopped and a next unit weaving is started.

8. The real time weaving motion control device of claim 7, wherein the working space weaving motion generator is configured to determine the weaving reference variable based on a time of the continuous motion, a trace length of the continuous motion, or a trace rotation amount of the continuous motion.

9. The real time weaving motion control device of claim 8, wherein the working space weaving motion generator is configured to determine the weaving reference variable, to determine a first variable using a weaving cycle and the determined weaving reference variable, and to generate a weaving function as a function of the first variable.

10. The real time weaving motion control device of claim 9, wherein the working space weaving motion generator is configured to generate a second weaving reference variable and the first variable, when the weaving reference variable does not arrive at the weaving change point.

11. The real time weaving motion control device of claim 7, wherein the working space motion synthesizing unit, the working space continuous motion generator, the working space weaving motion generator, and the compensation posture processor are synchronized with the weaving sampling time.

12. The real time weaving motion control device of claim 11, further comprising a joint space converter that is configured to receive an input of a position and a rotation amount of the robot from the working space motion synthesizing unit and that is configured to generate an operation of a joint of the robot so as to realize the weaving motion, wherein the joint space converter is synchronized with the weaving sampling time.

13. A method of controlling a real time weaving motion for controlling operation of a robot in a working space, the method comprising:

generating a unit motion in real time according to whether a real time change reason comprising a reason for a situation change of the working space and a motion path change while working occurs and selecting one of a unit motion that is determined before starting a motion of the robot and a unit motion that is generated in real time;

generating a unit weaving in real time according to whether the real time change reason occurs and selecting one of a unit weaving that is determined before starting a motion of the robot or a unit weaving that is generated in real time according to a weaving motion method selection information;

generating at least one of a compensation displacement and a compensation rotation amount that are determined according to a situation change of the working space; and calculating and controlling a position and a rotation amount of the robot in the working space according to at least one of the unit motion, the unit weaving, the compensation displacement, and the compensation rotation amount.

14. The method of claim 13, further comprising determining a relative weaving amount according to the selected unit weaving, wherein the determining of a relative weaving amount comprises determining a relative weaving amount within a weaving sampling time using the selected unit weaving and a weaving reference variable, and wherein the weaving reference variable comprises a weaving change point in which a current unit weaving is stopped and a next unit weaving is started.

15. The method of claim 14, wherein the determining of a relative weaving amount further comprises:

determining the weaving reference variable based on a time, a trace length, or a trace rotation amount of a continuous motion; and determining a first variable using a weaving cycle that repeats a weaving function and the determined weaving reference variable and generating the weaving function as a function of the first variable.

* * * * *